United States Patent

[11] 3,611,104

| [72] | Inventors | Salini T. Jalal<br>Birmingham;<br>George J. Spix, Clawson, both of Mich. |
|------|-----------|---------------------------------|
| [21] | Appl. No. | 57,143 |
| [22] | Filed | July 22, 1970 |
| [45] | Patented | Oct. 5, 1971 |
| [73] | Assignee | General Motors Corporation<br>Detroit, Mich. |

[54] CONTROLLED RECTIFIER TRIGGERING SYSTEM
10 Claims, 9 Drawing Figs.

[52] U.S. Cl. .................................................... 321/2,
307/252 K, 307/252 P, 318/231, 321/5, 321/69 R
[51] Int. Cl. .......................................................... H02m 5/40
[50] Field of Search ............................................. 307/252 R,
252 J, 252 K, 252 N, 252 Q; 318/231; 321/2, 5, 18,
27, 47, 60, 61, 69

[56] References Cited
UNITED STATES PATENTS

| 3,274,480 | 9/1966 | Walker ........................ | 321/61 |
| 3,343,005 | 9/1967 | Chauprade ................... | 307/252.53 |
| 3,372,323 | 3/1968 | Guyeska ...................... | 318/231 X |
| 3,407,348 | 10/1968 | Lawrence et al. ............ | 307/252.72 X |
| 3,539,901 | 11/1970 | Rosenberry, Jr. et al. ..... | 321/69 X |
| 3,551,779 | 12/1970 | Campbell ...................... | 321/18 X |

*Primary Examiner*—William M. Shoop, Jr.
*Attorneys*—E. W. Christen and C. R. Meland ABSTRACT: A triggering system for a controlled rectifier converter such as a nonsynchronized cycloconverter utilized to supply a variable frequency alternating voltage to an induction motor from a source of alternating current. In this system the converter is comprised of 36 controlled rectifiers connected in six three-phase full-wave bridge circuits. The direct current output terminals of the respective bridge circuits are connected respectively with the phase windings of a polyphase induction motor. The triggering system for gating the controlled rectifiers includes a plurality of transformers having secondary windings coupled to the gate-cathode circuits of the controlled rectifiers. The transformers have control and bias primary windings. The control windings are connected with a plurality of switches controlled to provide a three-phase sequence and also by a chopper which provides a pulsating input to pairs of primary windings. When the chopper deenergizes a respective primary winding the bias winding serves to reset the core of the transformer.

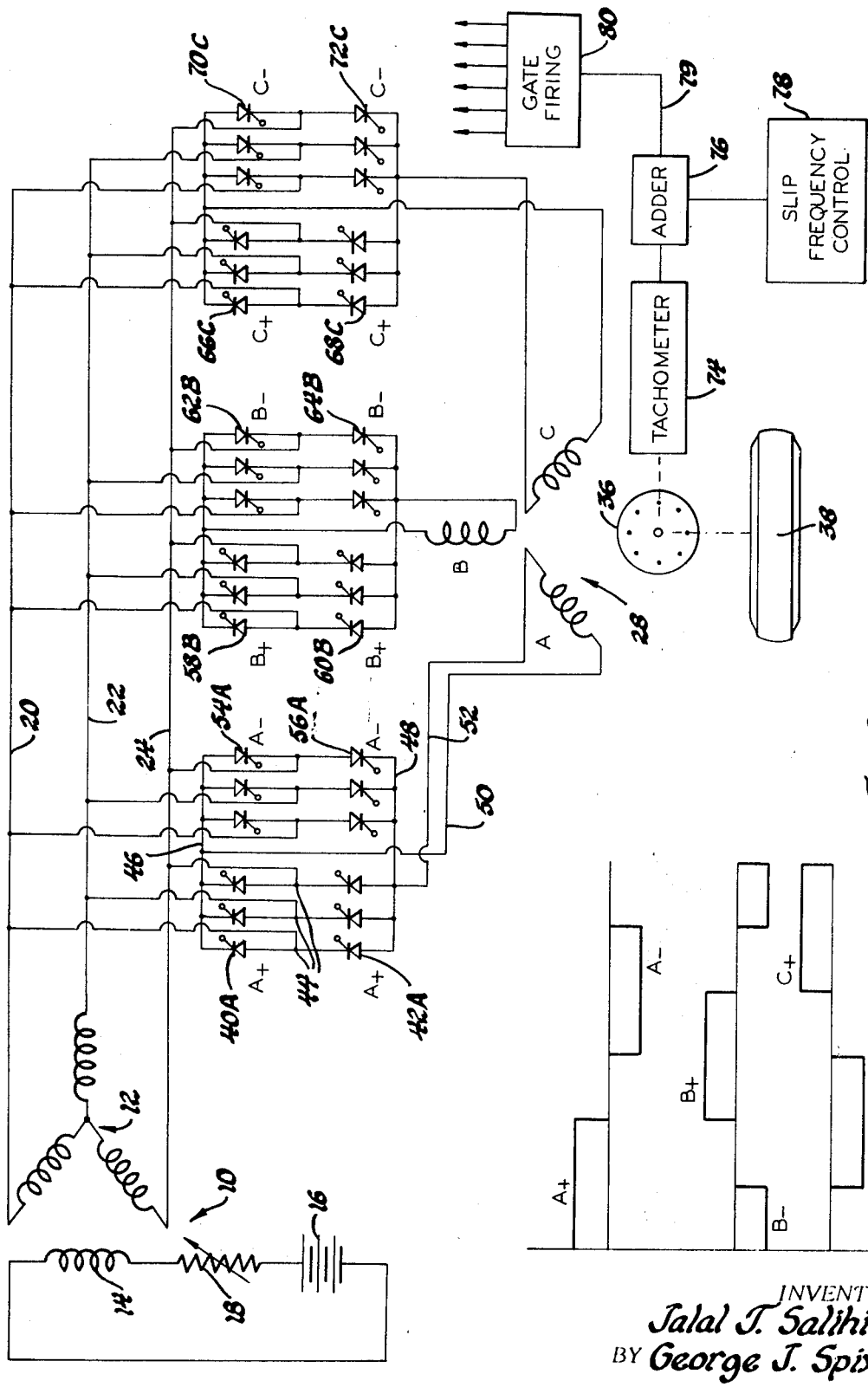

CONTROLLED RECTIFIER TRIGGERING SYSTEM

This invention relates to a triggering for controlled rectifiers and more particularly to a triggering system for a controlled rectifier converter circuit which operates as a frequency changer between a source of alternating current and an induction motor.

In operating controlled rectifier cycloconverters connected between a source of alternating current and an electrical load requiring a variable frequency, such as an induction motor, it is important that the gate circuits of the controlled rectifiers be isolated from each other and that the controlled rectifiers be gated on at the proper instant of time so as to provide the proper frequency for the motor and to prevent short circuiting within the converter which might occur if certain controlled rectifiers were simultaneously gated conductive during a certain period of time. In motor control systems where the output frequency of the converter is carried and in particular where the output frequency of the converter is used in a controlled slip frequency induction motor system the output frequency of the converter may be very low. This creates a problem where transformer isolation is used to couple gate signals to the controlled rectifiers since the transformer must be very large to handle the low frequency energization.

It accordingly is one of the objects of this invention to provide a triggering system for the controlled rectifiers of the converter where the coupling transformer is of relatively small size. By making the transformer as small as possible its leakage reactance is reduced as is the capacitive coupling between windings. This reduces the likelihood of false triggering of the controlled rectifiers due to high-frequency noise signals. The transformer, according to this invention, can be made small since the present invention contemplates energizing the primary windings of the transformer by a chopper which is operated at a relatively high frequency and by a switching arrangement which determines the time and period during which a controlled rectifier is gated conductive.

Another object of this invention is to provide a triggering system for the controlled rectifiers of a converter where a plurality of transformers are provided and where the secondaries of these transformers are coupled to the gates of the controlled rectifiers and further to a system where the current supplied to the primary windings of the transformers is pulsed or chopped and where the primary winding current is further controlled by a logic circuit including a plurality of switching devices. In carrying this object forward the transformers preferably have bias windings fed from a source of direct current which resets the core of the transformer when the choppings signal chopping one of the primary windings. This ensures a sharp rising pulse which is useful in firing a controlled rectifier.

Still another object of this invention is to provide a motor control system for an induction motor where the frequency of the voltage applied to the motor from a source of alternating current is controlled by a controlled rectifier converter and to a system wherein the triggering circuit for the controlled rectifiers includes transformers energized by a chopper or pulser and also by a logic circuit which provides a predetermined polyphase firing sequence for the converter.

IN THE DRAWINGS:

FIG. 1 is a schematic circuit diagram of a power supply system of an induction motor including a controlled rectifier converter;

FIG. 2 is a timing chart which graphically illustrates the voltages applied to the phase windings of the induction motor shown in FIG. 1 during switching of the converter;

Figure 3:
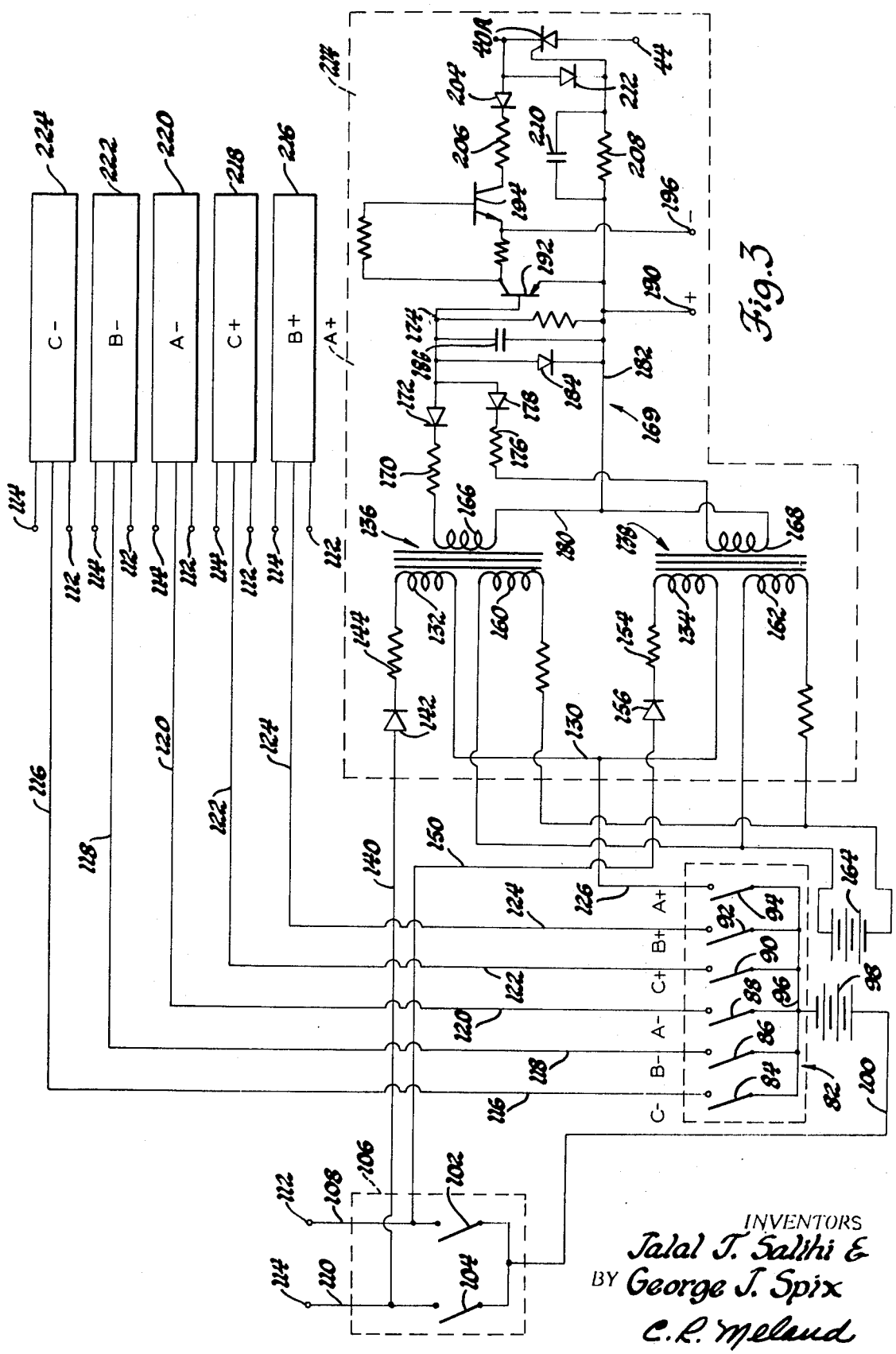
FIG. 3 is a schematic circuit diagram of the controlled rectifier gate-triggering system of this invention.

Referring now to the drawings and more particularly to FIG. 1 an electric propulsion system for a vehicle is illustrated wherein the reference numeral 10 designates a source of polyphase alternating current. As shown on the drawings the source of alternating current is a three-phase Y-connected alternating current generator having a three-phase Y-connected output winding 12 and a field winding 14. The field winding 14 is connected in series with a source of direct current 16 through a variable resistor 18 which could be a voltage regulator which regulates the output voltage of the generator.

One use for the system to be described is in the electric propulsion of motor vehicles such as earth movers and in such a system the field winding 14 can be carried by the rotor of the generator (not illustrated) which is driven by a prime mover such as a Diesel engine or a turbine. It is pointed out, however, that the source of alternating current could also be a three-phase source of commercial power where the motor control system and gate firing system were used in a building such as a manufacturing facility.

The output winding 12 of the generator is connected with power supply conductors 20, 22 and 24 and a three-phase voltage is therefore applied to these conductors.

The reference numeral 28 designates a three-phase induction motor having phase windings A, B and C. This induction motor has a squirrel cage rotor designated by reference numeral 36 which for the vehicle application is shown mechanically connected to a driving wheel 38 of a vehicle. If desired each wheel can be driven by a motor or one motor can drive two wheels.

The frequency of the voltage applied to the phase windings of the induction motor from the conductors 20–24 is controlled by alternating current to an alternating-current converter which is comprised of 36 controlled rectifiers shown in FIG. 1. This converter includes a first three-phase full-wave bridge rectifier circuit comprised of three controlled rectifiers 40A and three controlled rectifiers 42A. The AC input terminals 44 of this bridge rectifier network are connected respectively with the power supply conductors 20, 22 and 24. This bridge rectifier network has direct current output terminals connected with conductors 46 and 48.

It will be appreciated by those skilled in the art that if controlled rectifiers 40A and 42A are simultaneously gated conductive a direct voltage will be developed at conductors 46 and 48. This direct voltage will be applied to the phase winding A of the induction motor by conductors 50 and 52 connected with conductors 46 and 48. The current will flow through phase winding A from conductor 50 to conductor 52 and the voltage applied to phase winding A, for this period of conduction, is identified as A+ in FIG 2.

In order to provide a direct current of an opposite polarity to phase winding A of the induction motor another three-phase full-wave bridge rectifier circuit is provided which is comprised of three controlled rectifiers 54A and three controlled rectifiers 56A. It can be seen that if these controlled rectifiers are all gated conductive direct current will now be supplied to phase winding A of the motor in a reverse polarity and indicated by the square wave A− in FIG. 1. It will of course be appreciated that the triggering system of this invention only gates a given group of controlled rectifiers on for a given period of time as will be explained more fully hereinafter.

From an inspection of FIG. 1 it can be seen that four other bridge rectifier circuits are provided for energizing motor phase windings B and C with opposite polarity voltages. Thus, phase winding B will be energized with the B+voltage shown in FIG. 2 when the three controlled rectifiers 58B and the three controlled rectifiers 60B are gated conductive. The polarity of the voltage will be reversed on phase winding B to provide the B− voltage shown in FIG. 2 when the three controlled rectifiers 62B and the three controlled rectifiers 64B are gated conductive. +The voltage C+is applied to phase winding C when the three controlled rectifiers 66C and the three controlled rectifiers 68C are gated conductive. This voltage will be reversed to provide voltage C− shown in FIG. 2 when the three controlled rectifiers 70C and the three controlled rectifiers 72C are gated conductive.

The triggering system of this invention will gate the groups of controlled rectifiers conductive in accordance with the sequence shown in FIG. 2. In this regard it is pointed out that the controlled rectifiers in FIG. 1, in addition to being designated by a reference numeral such as 40A, have also been designated by letters A+, A−, B+, B−, C+ and C− corresponding to the timing chart of FIG. 2 and indicating the conduction periods of groups of controlled rectifiers. As one example of this voltage A+ in FIG. 2 is applied to motor phase winding A when controlled rectifiers 40A and 42A (also designated A+) are conductive. This has been done through out the specification and drawings in regard to other circuits in order that the operation of the system may be more readily understood. In all cases the designation by the letters used in FIG. 2 indicates that a particular control circuit designated by the same letter is used to provide the cycle of operation shown in FIG. 2.

It will be observed, from FIG. 2, that the voltages applied to the phase windings of the motor are of 120° duration and substantially a square wave voltage although this wave shape will have some ripple (not shown) due to rectification. It will further be observed, from FIG. 2, that two-phase windings are energized over predetermined periods of time. As an example, it can be seen that from 0° to 60° phase windings A and B are energized with A being energized with a positive voltage A+ and B with a negative voltage B−. For this 60° period the controlled rectifiers 40A, 42A, 62B and 64B will be gated conductive. The remainder of the gating sequence for the controlled rectifiers of the converter will be evident from an inspection of FIG. 2 and the gating circuit of this invention, which provides these control signals is described hereinafter.

The converter that has been described which is comprised of 36 controlled rectifiers connected in six full-wave bridge circuits may be termed a nonsynchronized type since no attempt is made to gate the controlled rectifiers in regard to any particular phase relationship of the output voltages of the output winding 12 with respect to the point in time when the controlled rectifiers are gated conductive. In other words, the gate signals for the controlled rectifiers are not synchronized with the sinusoidal voltage appearing at conductors 20, 22 and 24. Moreover, it will be apparent that the converter is actually a rectifier circuit comprised of six three-phase full-wave bridges which are rendered conductive in accordance with the timing diagram of FIG. 2. It should be further pointed out that a substantially square wave will not be the ideal square wave shown in FIG. 2 but will have some ripple (not shown) due to the fact that it is provided by full-wave rectification.

It should be pointed out that the frequency of the voltage applied to the induction motor can be varied by varying the switching frequency of the controlled rectifiers of the converter. It therefore will be apparent that the frequency of the voltage applied to the motor can differ from the output frequency of the generator 10 and the system therefore operates as an AC to AC converter or frequency changer.

Although the switching frequency of the controlled rectifiers can be varied by many different control arrangements, the frequency control will be described with reference to what is known in the art as a controlled slip frequency induction motor power supply system. These systems are known in the art and are shown for example in the U.S. Pats. to Salihi et al., No. 3,471,764, granted on Oct. 7, 1969 and to Agarwal et al., No. 3,323,032, granted on May 30, 1967. The specific slip frequency control arrangement forms no specific part of the present invention and may take various forms. To schematically illustrate one such system the motor rotor 36 is shown mechanically coupled to a tachometer designated by reference numeral 74. This tachometer may be a tachometer generator which develops a voltage which is a function of induction motor rotor speed or might be a device which develops a series of pulses the frequency of which are a function of rotor speed. The speed signal from the tachometer is combined in an adder 76 with a signal from a slip frequency control device designated by reference numeral 78. As an example, the adder could add a direct voltage from the tachometer to another direct voltage from the slip frequency control 78 to provide a voltage which would be a function of induction motor rotor speed and a function of the desired slip frequency for the induction motor. The output voltage of the adder could then be converted to a series of pulses and applied via line 79 to a gate firing circuit 80 which is described in detail hereinafter. Alternatively the slip frequency control system could add a signal indicative of rotor speed to a slip frequency signal by the system shown in the above mentioned patent to Salihi et al., U.S. Pat. No. 3,471,764. In any event the output of the adder should be a series of pulses which can be utilized to properly control the gate firing circuit 80. Only six output leads are shown for circuit 80 it being understood however that 36 of these leads are required.

The gate firing circuit 80 comprises a number electrical circuits shown in FIGS. 3, 5, 6, and 7 which will now be described.

Figure 6:
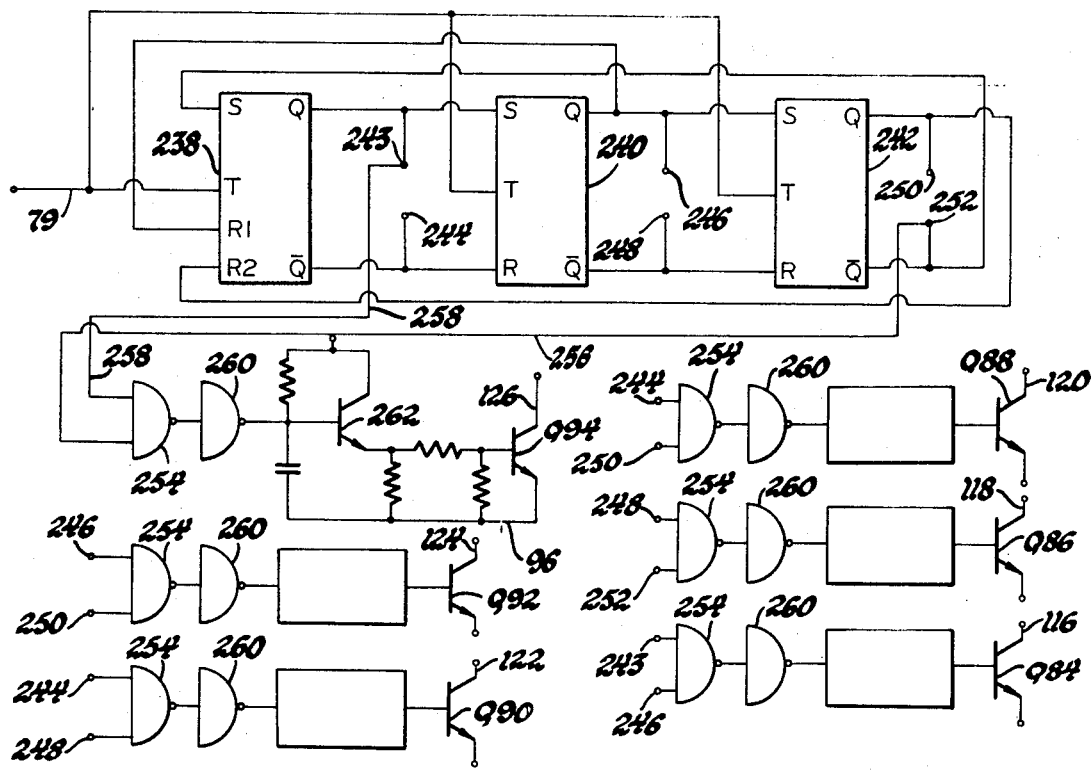
FIG. 6 is a schematic circuit diagram of a logic circuit for developing a three-phase logic for the electrical system of this invention.
Figure 7:
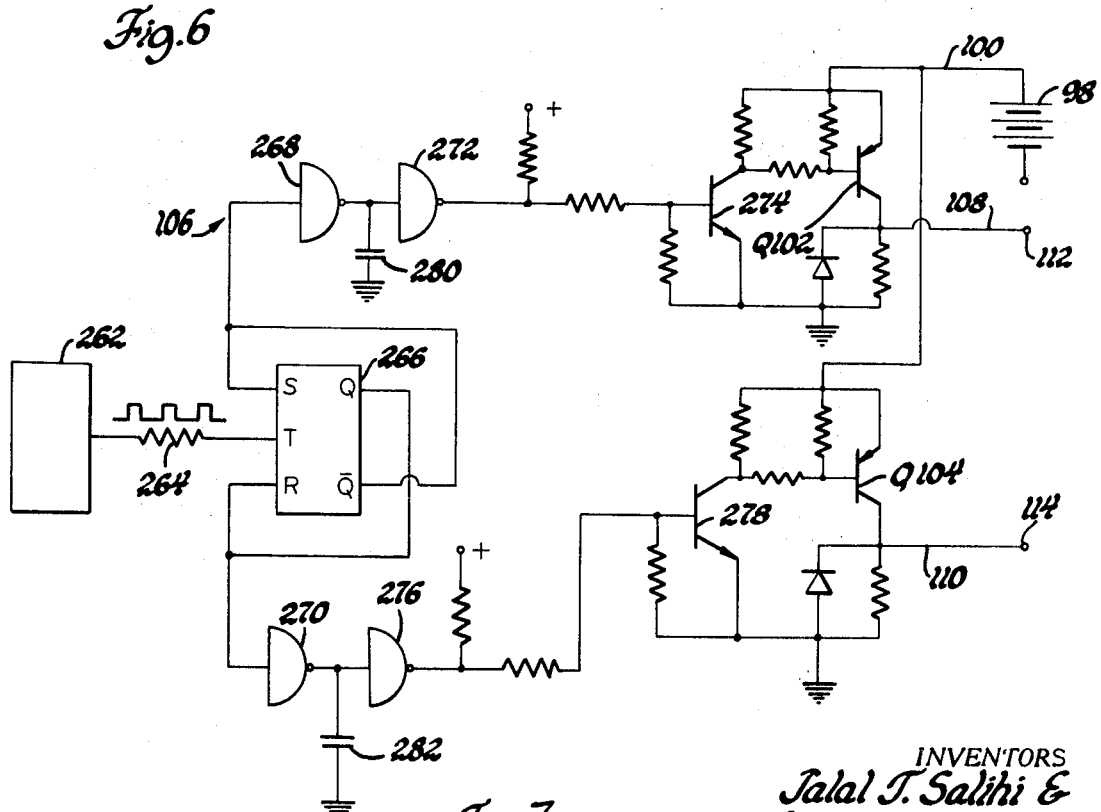
FIG. 7 is a schematic circuit diagram of a chopper for sequentially energizing the primaries of the pulse transformers of the system of this invention.

In FIG. 3 the reference numeral 82 has been used to designate the three-phase control logic for controlling the switching of the proper group of controlled rectifiers in accordance with the sequence shown in FIG. 2. The logic control 82 is shown comprised of switches 84, 86, 88, 90, 92 and 94 which form part of a circuit for energizing transformer primary windings to be described hereinafter. These switches are actually transistors as shown in FIG. 6 but have been shown as switches in FIG. 3 for ease in explaining the operation of this invention. One side of the switches are commonly connected to a conductor 96 which in turn is connected to the negative side of a source of direct current 98. The positive side of the source of direct current 98 is connected with a conductor 100 which in turn is connected to one side of switches 102 and 104 which form a chopper designated by reference numeral 106. This chopper 106 is shown in FIG. 7 and the switches 102 and 104 are again transistors identified as Q102 and Q104 in FIG. 7. The opposite sides of the switches 102 and 104 are connected with conductors 108 and 110 and these conductors are connected with junctions 112 and 114. It is to be understood that the junctions 112 and 114 are connected with the other junctions 112 and 114 shown in FIG. 3 by conductors which have not been illustrated in order to simplify the drawing.

The output conductors of the chopper 82 which are connected respectively to switches 84–94 have been designated by reference numerals 116, 118, 120, 122, 124 and 126. These conductors have also been identified with the same letters as the letters used in FIG. 2 to indicate what group controlled rectifiers is gated conductive when a given switch of the logic circuit 82 is closed.

The conductor 126 which determines the A+sequence shown in FIG. 2 is connected with a conductor 130. The conductor 130 is connected with primary windings 132 and 134 of transformers 136 and 138. It is further seen that the opposite side of primary winding 132 is connected with a conductor 140 through a diode 142 and a resistor 144. The conductor 140 goes to one side of switch 104 on conductor 110 of chopper 106. In a similar fashion the opposite side of primary 134 is connected with a conductor 150 through resistor 154 and diode 156. The conductor 150 is connected with one side of switch 102 of the chopper 106 and therefore to conductor 108.

The transformer 136 has a direct-current bias winding 160 and the transformer 138 has a similar bias winding 162. It is seen that these bias windings are connected across a source of direct current 164 through respective resistors shown in FIG. 3. The transformer 136 has a secondary winding 166 and the transformer 138 has a secondary winding 168. As is described hereinafter, with respect to FIG. 4, each transformer has six secondary windings. The windings 166 and 168 have voltages induced therein which are utilized to control a fast rise trigger generally designated 169 connected between these windings and the controlled rectifier 40A shown in FIG. 3. This fast rise trigger circuit includes a resistor 170 and diode 172 connected between conductor 174 and one side of secondary winding 166 and another resistor 176 and diode 178 connected between conductor 174 and one side of secondary winding 168. The opposite side of the secondary windings 166 and 168 are connected by conductor 180 which in turn is connected to conductor 182. A diode 184 and a capacitor 186 are connected across conductors 182 and 174. The conductor 182 is connected with a junction 190 which serves as a positive power supply input terminal for the fast rise trigger circuit. The conductor 174 is connected to the base of the NPN transistor 192. The emitter of this transistor is connected with conductor 182 while its collector is connected respectively with the emitter and base of an NPN transistor 194 through resistors as shown. The emitter of transistor 194 is connected with a junction 196 which provides a negative direct current input terminal for the fast rise trigger circuit.

The collector of transistor 194 is connected with the cathode of the controlled rectifier 40A through diode 204 and resistor 206. The conductor 182 is connected with the gate of controlled rectifier 40A through a parallel connected resistor-capacitor combination comprised of resistor 208 and capacitor 210. A diode 212 is connected between the cathode and gate of controlled rectifier 40A.

Figure 4:
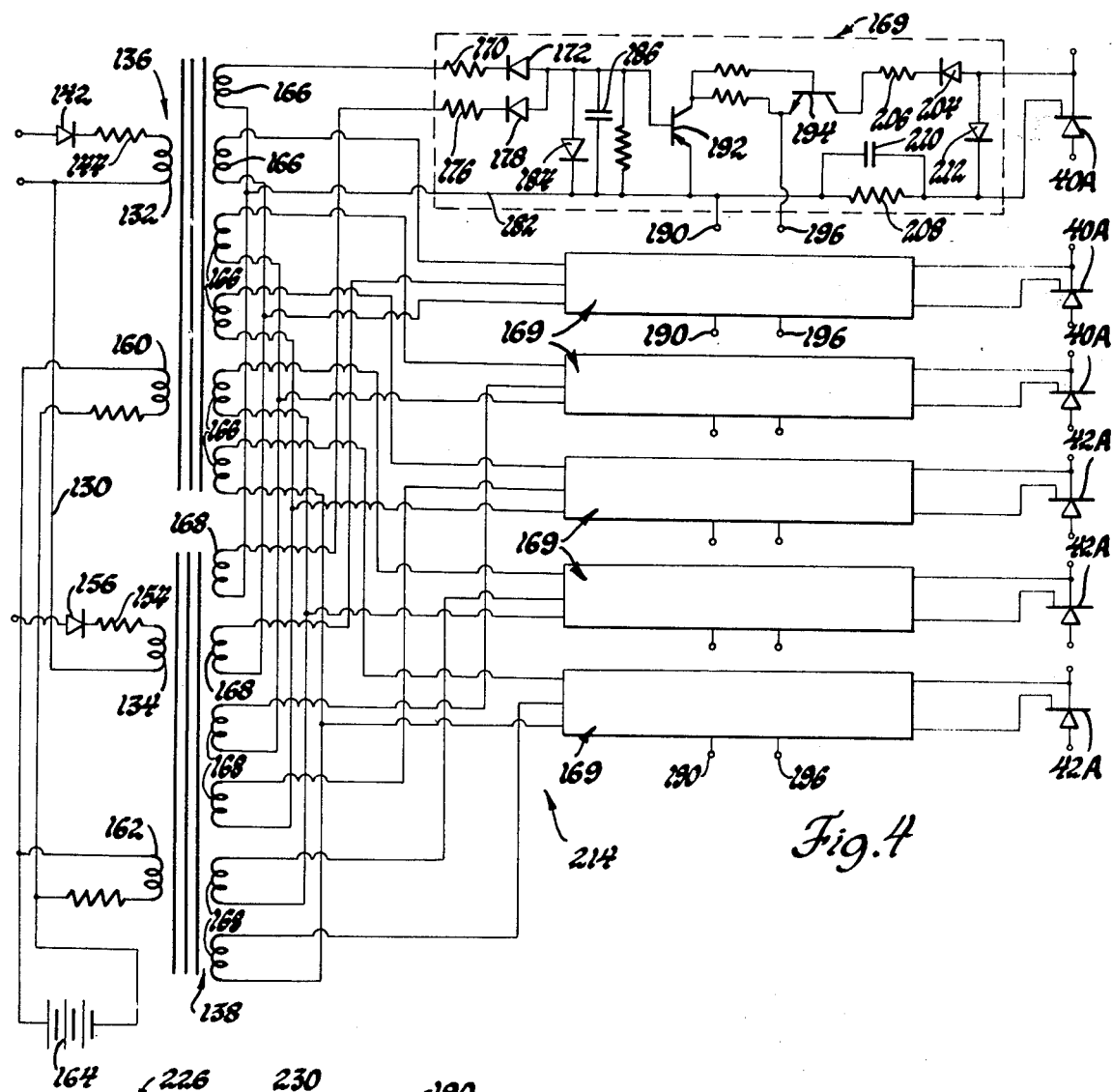
FIG. 4 is a schematic circuit diagram of one of the blocks forming a part of the system shown in FIG. 3.

It should be pointed out that the fast rise trigger circuit 169 which has been described forms only one channel or circuit for firing one controlled rectifier 40A. In order to fire six controlled rectifiers 40A and 42A which make up one bridge circuit six fast rise trigger circuits 169 and two transformers 136 and 138, each having six secondary windings, is required as shown in FIG. 4. In FIG. 3 it is to be understood that block 214 will comprise the circuit shown in FIG. 4 even though only one channel or circuit is shown in FIG. 3 to simplify the explanation of this invention. The system requires five other circuits shown as blocks and identified by reference numerals 216, 218, 220, 222 and 224 in FIG. 3. Each of these blocks is comprised of a circuit like that identified in its entirely by numeral 214 and shown in FIG. 4. Each of these circuits 216–224 therefore control the firing of six controlled rectifiers and each circuit includes six fast rise triggers 169 and two transformers each of the blocks 216 through 224 has also been identified by a letter indicating the voltage that is supplied to the motor in accordance with the FIG. 2 sequence chart when a given group of controlled rectifiers are fired. It therefore will be understood that each block 214–224 controls the conduction of six controlled rectifiers and block 214 will control the conduction of the six controlled rectifiers 40A and 42A as is evident from an inspection of FIG. 4.

Figure 9:
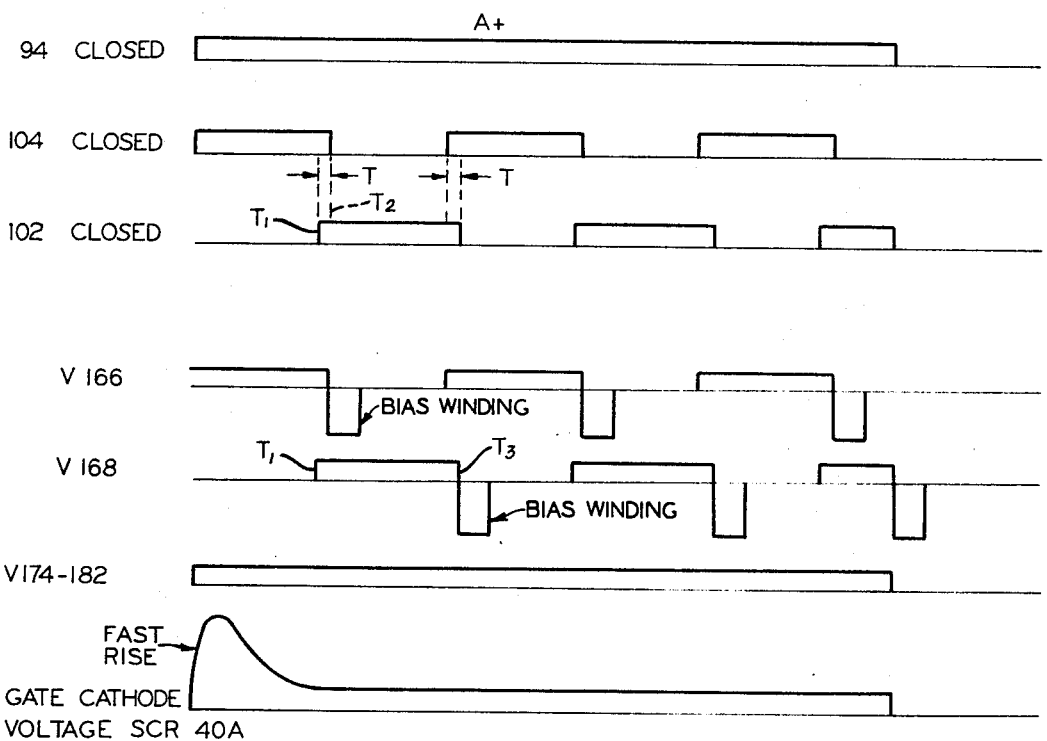
FIG. 9 are graphical representations of various voltages that occur in the system shown in FIG. 3.

Since each of the 36 gate-firing circuits operate in an identical manner only the operation of the gate firing circuit for controlled rectifier 40A will be described in detail in conjunction with FIGS. 3 and 9. In FIG. 9 seven curves are illustrated. The top curve identified as 94 indicates the time that the switch 94 is closed and also represents the time period in which it is desired to gate controlled rectifiers 40A and 42A conductive which will result in the voltage A+being applied to motor phase winding A shown in FIG. 2. The curves identified as 104 closed and 102 closed indicate the times that the switches 102 and 104 are closed. The curves identified as V166 and V168 illustrate the voltages developed across secondary windings 166 and 168 of transformers 136 and 138. The curve identified as V174–182 illustrates the voltage across conductors 174 and 182 in FIG. 3 and the curve identified as gate-cathode voltage SCR 40A indicates the voltage applied to the gate and cathode of controlled rectifier 40A.

Before proceeding to a detailed discussion of the operation of the triggering system of FIG. 3 it is pointed out that the switches 102 and 104, according to the timing diagram of FIG. 9, are alternately closed and simultaneously closed for a short overlapping period of time identified as T in FIG. 9. It should also be pointed out the cores of transformers 136 and 138 are formed of a square-loop material and that the system is arranged such that the ampere-turns of a primary control winding is greater than the ampere-turns of a bias winding. Thus, the ampere filters of primary winding 132 is greater than the ampere-turns of bias winding 160 and the flux developed by these windings is in opposition. The same relationship exists between primary winding 134 and bias winding 162.

Referring to FIG. 3 let it be assumed that the switches 102 and 104 are opened and closed in accordance with the timing diagram of FIG. 9 and that they are simultaneously closed for short overlapping periods of time as indicated by T. Let it further be assumed that the logic switch 94 is closed for the length of the entire cycle (A+) as shown in FIG. 9. Assuming these conditions to exist with switches 94 and 104 closed the primary winding 132 of transformer 136 will be energized by a circuit that can be traced from the positive side of direct current source 98, through conductor 100, through closed switch 104, through conductor 140, through diode 142, through resistor 144, through primary 132, through conductor 130, through conductor 126 then back to the negative side of the source of direct current 98 through closed switch 94 and conductor 96. This energization of primary winding 132 will cause a voltage V166 to be induced in secondary winding 166. At time $T_1$ switch 102 is closed and for the time period T both switches 102 and 104 are closed. It now will be appreciated that primary winding 134 is energized from direct current source 98 through a circuit that includes the conductor 150.

At point or time $T_2$ when switch 104 opens to terminate energization of primary 132 a voltage V166 is induced in winding 166 which is of an opposite polarity to that when 104 was closed and this is due to the current supplied to bias winding 160 by the direct current source 164. This current resets the core of transformer 136. In addition, it can be seen that at time $T_1$ when switch 102 closes a voltage V168 is now induced in secondary winding 168 of transformer 138. At time $T_2$ switch 104 opens while switch 102 closes a voltage V168 is now induced in secondary winding 168 of transformer 138. At time $T_2$ switch 104 opens while switch 102 is still closed and the voltage V168 continues in a positive direction until time $T_3$ where the cycle repeats itself. At time $T_3$ a negative voltage is induced in secondary winding 168 due to bias winding 162. It can be seen from FIG. 9 that the voltages V166 and V168, when added together, provide the voltage V174–182 which is exactly the same pulse width as voltage A+ shown in FIG. 9 provided by the closure of logic switch 94. The negative excursions of voltages V166 and V168 due to bias windings 160 and 162 do not affect the fast rise triggers 169 because of diodes 172 and 178. It should be pointed out that during the switching of switches 102 and 104 which periodically energize deenergize primary windings 132 and 134 the cores of transformers 136 and 138, which are affected by this switching and the bias windings 160 and 162, do not become saturated in the forward direction but are saturated in the opposite direction by the bias windings.

The voltage V174–182 is applied in the proper polarity to the emitter-base circuit of transistor 192 which drives it into a conducting mode. This will turn on the transistor 194 in its collector-emitter circuit and a voltage is then applied to the gate-cathode circuit of controlled rectifier 40A which is illustrated in FIG. 9 to gate controlled rectifier 40A conductive. This voltage is applied via positive terminal 190, conductor 182, capacitor resistor combination 208–210, then the gate-cathode circuit of controlled rectifier 40A, diode 204, resistor 206, and then through the collector-emitter path of transistor 194 to power supply terminal 196.

To summarize the operation of the triggering system that has been described it will be appreciated that the triggering system of this invention accepts a control signal such as the signal A+ shown in the top line of FIG. 9 and provides a signal V174–182 which has the same pulse width as the control signal provided by the closure of switch 94. The system accomplishes this by alternately energizing the primary windings of the transformers 136 and 138 with energization periods depicted in FIG. 9 which slightly overlap to provide secondary voltages which are, in effect, voltage segments with a slight overlap. These secondary voltage segments merge into a continuous direct voltage signal V174–182 which is then replica of the A+signal shown in FIG. 9 even though the transformation has occurred by high-frequency chopping of the primary windings of the transformer. As pointed out previously, this permits the transformer to be of relatively small size to reduce leakage inductance and capacitance between the windings of the transformer with the further result that paths for high-frequency noise interference are substantially eliminated to provide reliable operation of the converter. It is pointed out again that this system isolates the gate-cathode circuits of the 36 controlled rectifiers from each other and does it in a manner which permits the use of a relatively small transformer.

Referring now more particularly to FIG. 4 which has been described to some extent the six fast rise trigger circuits 169 which comprise the firing system 214 for the controlled rectifiers 40A and 42A is illustrated. In FIG. 4 the same reference numerals have been used to identify the same components as have been discussed with regard to the other figures of the drawings. It can be seen from an inspection of FIG. 4 that the transformer 136 has six secondary windings 166 that are connected as shown with respective fast rise trigger circuits 169. It also can be seen that the transformer 138 has six secondary windings 168 connected as illustrated with fast rise trigger circuits 169. The fast rise trigger circuits are shown connected respectively with the three controlled rectifiers 40A and the three controlled rectifiers 42A and it therefore will be appreciated that the group trigger identified in its entirety by reference numeral 214 controls the bridge rectifier comprised of controlled rectifiers 40A and 42A and therefore controls the A+ voltage that is applied to phase winding A of the induction motor 28. It is further seen from an inspection of FIG. 4 that the transformer 136 has a primary winding 132 and a bias winding 160 and that the transformer 138 has a primary winding 134 and a bias winding 162. The bias windings 160 and 162, as previously described with regard to FIG. 3, are energized from the source of direct current 164. The primary windings 132 and 134 correspond to the primary windings shown in FIG. 3 and are energized under the control of switch 94 and chopper switches 102 and 104.

Figure 5:
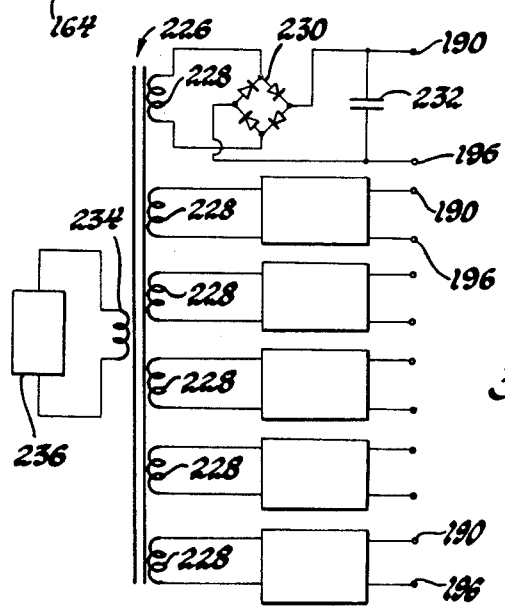
FIG. 5 is a schematic circuit diagram of a preferred power supply arrangement for the trigger circuits shown in FIG. 4.

The direct voltage sources which are connected to the terminals 190 and 196 of the fast rise trigger circuits 169 are shown in FIG. 5. This power supply includes a transformer designated by reference numeral 226 having a plurality of secondary windings each designated by reference numeral 228. Each secondary winding 228 is connected with a bridge rectifier designated by reference numeral 230 and the direct current output terminals of each bridge rectifier is connected with terminals 190 and 196 which are connected with the terminals 190 and 196 of a respective fast rise trigger circuit by conductors which are not illustrated. A filter capacitor 232 is connected across each of the pair of direct current output terminals 190 and 196. Only one of the rectifier circuits has been illustrated schematically in FIG. 5, the remainder of the circuits being shown as blocks and it being understood that the remaining five circuits illustrated in block form are identical with the one that has been described and are connected, respectively, with the terminals 190 and 196 of the fast rise triggers. The primary winding 234 of the transformer 226 is connected to a transistor oscillator designated by reference numeral 236 which has an output of 2 c. In the actual physical layout of the fast rise triggers 169 and the power supply shown in FIG. 5, the power supply is disposed as close as possible to the fast rise triggers to reduce the change of spurious noise entering the system to cause false triggering of the controlled rectifiers. In order to supply power to the 36 fast rise trigger circuits 169, which are required, six transformers and associated bridge rectifiers of the circuit configuration shown in FIG. 5 are provided. However, the primary windings of the transformers, such as winding 234 are all supplied by the transistor oscillator 236. This is accomplished by connecting all of the six primary windings in parallel and across the output of transistor oscillator 236. In a preferred arrangement the secondary windings 228 and a primary winding 234 are wound in a sectionalized side-by-side fashion on an annular core which further improves the noise immunity of the system.

Figure 8:
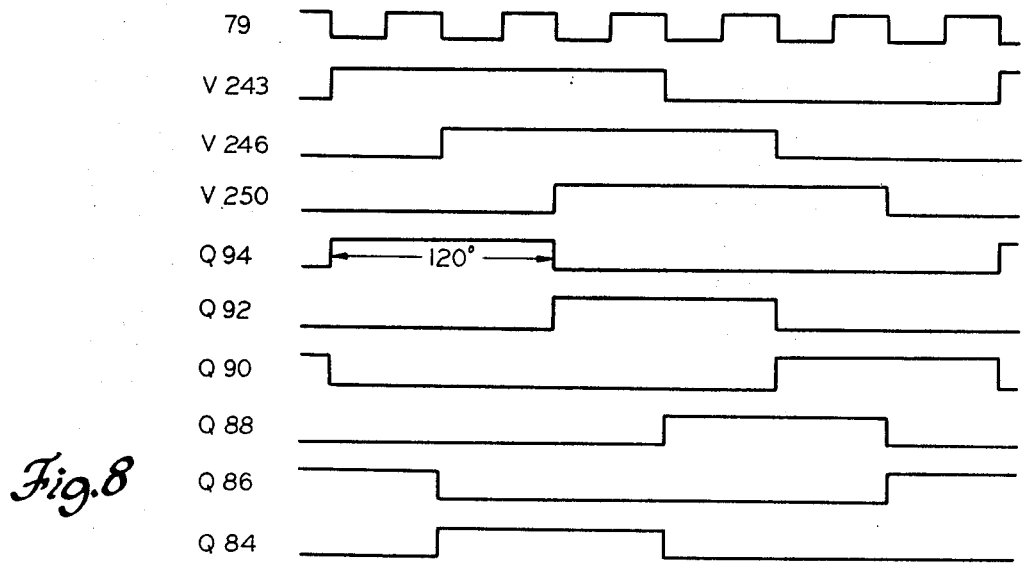
FIG. 8 illustrates graphically voltages developed by the system shown in FIG. 6.

As previously pointed out, the switches 84–94 which form the three-phase logic designated by reference numeral 82 in FIG. 3 are actually transistor switching devices and the electronic circuitry comprising the switching logic 82 is shown in FIG. 6 and will now be described with the aid of the voltage timing diagram illustrated in FIG. 8. Referring now to FIG. 6, the reference numeral 79 designates an input conductor for the logic system which corresponds to the conductor 79 shown in FIG. 1. A series of pulses are applied to the input conductor 79 which are a function of the actual rotor speed of the induction motor added to the desired slip frequency that is set for the system. The frequency of the pulses are six times the synchronous frequency of the motor. The input conductor 79 is connected with a flip-flop designated by reference numeral 238. The flip-flop 238 has terminals designated by the letters S, T, $R_1$, $R_2$, Q and $\overline{Q}$ which represent set, trigger reset terminals and output terminals for the flip-flop. The flip-flop 238 together with the flip-flops 240 and 242 form a ring counter in a manner known to those skilled in the art when they are electrically connected as shown in FIG. 6. It is seen that the flip-flops 240 and 242 have terminals designated by letters S, T, R, Q, and $\overline{Q}$. The flip-flops 238, 240 and 242 can be purchased as integrated logic circuits and for example can be of the Fairchild type DT$\mu$L948. It is seen that the conductor connecting the terminals Q and S of the flip-flops 238 and 240 is connected with a terminal 243. In a similar fashion the conductors connecting the terminals $\overline{Q}$ and R of flip-flops 238 and 240 are connected with a junction 244. Similar connections between the flip-flops are connected with the terminals 246, 248, 250 and 252. The series of pulses that are applied to the conductor 79 are shown in the top line of the timing diagram of FIG. 8. By the connections of the flip-flops 238–242, shown in FIG. 6, voltages are developed at junctions 243, 246 and 250 which are depicted in FIG. 8. The voltages which are developed at junctions 244, 248 and 252 are of the same duration as those developed respectively at junctions 243, 246 and 250 but of an opposite polarity. From an inspection of Fig. 6 it can be seen that the junction 252 is connected with one of the inputs of a two input NAND gate designated by reference numeral 254 by conductor 256. The terminal 243 of the shift register is connected with the other input of the NAND gate 254 by a conductor 258. The output of the NAND gate 254 is applied to the input of a single input NAND gate (inverter) designated by reference numeral 260. The output of NAND gate 260 is applied to the base of an NPN transistor designated by reference numeral 262. The emitter of transistor 262 is coupled to the base of another NPN transistor which is designated by reference numeral Q94. The transistor Q94 forms the switch 94 shown in FIG. 3 and therefore forms part of the logic circuit 82 shown in FIG. 3. The conduction of the NPN transistor Q94 is illustrated in the timing diagram of FIG. 8 where it is seen that it is conductive for a 120° period illustrated in this diagram. It is seen in FIG. 6 that there are five other circuits which are identical with the circuit that has just been described and each of the circuits has a pair of input terminals for the NAND gates designated by the same reference numerals as used for the outputs of the flip-flops 238, 240 and 242. It is to be understood that the input terminals of the NAND gates 254 of these circuits are connected with the output terminals designated by like reference numerals of the flip-flops of the shift register by conductors which are not illustrated. The output transistors of each of these circuits or the remaining five circuits have been designated by reverence numerals Q92, Q90, Q88, Q86 and Q84, it being understood that these transistors represent the switches of like reference numerals shown in FIg. 3. In addition, the conductors 116–126 have been shown connected respectively to the collectors of transistors Q84–Q94 and these conductors correspond to the conductors of like reference numerals shown in FIG. 3. In FIG. 8 the conduction periods for the other five transistors, in addition to transistor Q94, are illustrated it being understood that each conduction period is for a period of 120°.

In summary, it can be seen that the logic circuit shown in FIG. 6 receives a series of pulses (79) from the system which are a function of the actual rotor speed of the induction motor 28 added to a desired slip frequency and that these pulses provide for conduction of transistors Q84 through Q94 with a 120° conduction periods which are displaced as shown in FIG. 8. The result of this switching is to provide for energization of the phase windings A, B and C of the induction motor 28 according to the diagram shown in FIG. 2. It will be appreciated of course at the the conduction periods of the transistors Q84–Q94 shown in FIG. 8 correspond to the conduction periods for the controlled rectifiers shown in FIG. 1 and depicted graphically in FIG. 2. In this regard, when transistor Q94 is conductive it provides the voltage A+, shown in FIG. 2, to the phase winding A of the induction motor shown in FIG. 1. Other conduction periods for the remainder of the cycle can be readily traced by those skilled in the art.

As previously pointed out the switches 102 and 104 of the chopper 106 (FIG. 3) are actually transistors and the circuit 106 which is illustrated in FIG. 7 will now be described. The chopper circuitry illustrated in FIG. 7 includes an oscillator which is designated by reference numeral 262. The oscillator 262 has an output coupled to resistor 264 and this oscillator provides a 20 c. output as a series of pulses which are illustrated in FIG. 7. The resistor 264 couples the output of the oscillator 262 to the trigger input of a flip-flop designated by reference numeral 266 and having terminals designated by the letters S, T, R, Q and $\overline{Q}$. The flip-flop 266 is of a conventional design and may be, for example, a Fairchild DTμL948 flip-flop. The flip-flop 266 has its S and $\overline{Q}$ terminals coupled to an NAND gate designated by reference numeral 268. In a similar fashion, the output terminals R and Q of the flip-flop 266 are connected with a NAND gate designated by reference numeral 270. The output of NAND gate 268 is coupled to a NAND gate 272 and the output of this NAND gate is coupled to an NPN transistor designated by reference numeral 274. The collector of transistor 274 is connected to the base of a PNP transistor designated as Q102. The transistor Q102 represents the switch 102 illustrated in FIG. 3. It will be appreciated that when the transistor 274 is biased conductive from a signal from NAND gate 272, the transistor Q102 is likewise biased conductive to therefore connect the power supply conductor 100 and the conductor 108 illustrated in FIGS. 3 and 7.

The output of NAND gate 270 is applied to the input of a NAND gate designated by reference numeral 276. The output of NAND gate 276 is applied to the base of an NPN transistor designated by reference numeral 278. The collector of NPN transistor 278 is connected with the base of a PNP transistor designated as Q104. The transistor Q104 performs the switching function of the switch 104 shown in FIG. 3. In this regard, the collector of transistor Q104 is shown connected to conductor 110 and junction 114 which have corresponding junctions and conductors designated by the same reference numerals in FIG. 3.

To summarize the operation of the circuit illustrated in FIG. 7 it will be appreciated that the oscillator 262 provides a series of pulses at a relatively high frequency, for example, 20 Kc. to the flip-flop 266. The flip-flop 266 provides alternate conduction for the transistor Q102 and Q104 at a 20 c. rate and this alternate conduction is illustrated in the timing diagram of FIG. 9 where the diagram illustrates the conductive or closed condition of the switches 104 and 102 which, of course, correspond to the conductive state of transistors Q102 and Q104 shown in FIG. 7. The overlap in conduction periods designated as time T in FIG. 9 is due to the capacitors 280 and 282 which are connected respectively between the NAND gates 268 and 272 and 270 and 276. It therefore will be seen that the electronic circuitry shown in FIG. 7 provides the chopping function of causing transistors Q102 and Q104 overlap for a short period of time. This, as explained hereinbefore, is necessary in order to provide the continuous signal V174–182 illustrated in FIG. 7 or in other words to prevent a discontinuity in the trigger signal that is applied to the fast rise trigger circuit.

To summarize the overall operation of the triggering system for the controlled rectifiers that has been described it will be appreciated that a series of pulses are applied to conductor 79 shown in FIG. 1 which have a frequency that is a function of the actual rotor speed of the induction motor rotor 28 added to a desired slip frequency from the slip frequency control device 78. Pulses provided on conductor 79 control the logic circuit 82 which is shown as a series of switches in FIG. 3 and which is shown in detail on FIG. 6. The logic circuit 82 shown in FIGS. 3 and 6 causes the switches 84–94 or transistors Q84–Q94 to close for predetermined periods of time. These are 120° conduction periods as is illustrated in FIG. 8 and provide for conduction of the controlled rectifiers in FIG. 1 to provide energization of the phase windings of the induction motor 28 shown in FIG. 1 according to the timing diagram shown in FIG. 2. In addition and as has been explained hereinbefore the switches 102 and 104, which are actually transistors Q102 and Q104, are continuously alternately switched on with a slight overlap as is depicted in FIG. 9 to provide sequential energization of the primary windings 132 and 134 of transformers 136 and 138. The secondary windings 166 and 168 of the transformer develop voltages which, as previously described, are combined to control the firing of a single controlled rectifier, for example, controlled rectifier 40A shown in FIG. 3.

It can be seen from an inspection of FIG. 9 that a fast rise voltage is applied to the gate-cathode circuit of the controlled rectifier 40A which has the same pulse width as voltage A+which is developed by the conduction of transistor Q94. It will be further appreciated from an inspection of FIG. 9 that the signal A+ has been chopped into segments by use of a relatively high frequency chopper and then these signals have been applied to windings of transformers to ultimately develop the voltages applied to conductors 174 and 182 of the fast rise trigger 169 which provide the gate-cathode voltage for the controlled rectifier 40A. By using the high-frequency oscillator and chopper arrangement, the transformers 136 and 138 can be made of relatively small size and still accurately control the switching of the controlled rectifiers of the converter without encountering noise problems that might cause false firing of the controlled rectifiers. As previously pointed out, the power supply shown in FIG. 5 is mounted closely adjacent the fast rise trigger circuits 169 so that relatively short leads are used for connecting the circuits to reduce the likelihood of noise causing a false triggering of the controlled rectifiers of the converter.

The switching frequency of switches 102 and 104 is higher than the switching frequency of the logic circuit 82 so that for every conduction period determined by one logic switch of circuit 82 the chopper switches a plurality of times. As an example of this, and referring to FIG. 9, it can be seen that while switch 94 was closed switches 102 and 104 have switched on and off three times.

When one of the chopper switches 102 or 104 switches off to deenergize a primary winding of a transformer the bias winding resets the core of the transformer. This occurs as shown in FIG. 9 when a negative voltage is induced in a secondary winding at times $T_2$ and $T_3$.

It will be appreciated from the foregoing that a triggering system for a plurality of controlled rectifiers has been provided which provides isolation between the triggers for the individual controlled rectifiers and also provides fast rise trigger signals for the controlled rectifiers. It will be further appreciated that the triggering system contains features which render it less sensitive to spurious noise which might otherwise cause a malfunction of the system. In this regard the transformers, like transformers 136 and 138 that are used in the fast rise triggers, are made small to reduce capacitive coupling between their secondary windings and are wound in a sectionalized manner. The reason the transformer can be made small is due to the fact that it is energized at a relatively high frequency, for example 20 c.

The system is further rendered immune to noise by minimizing the length of leads between the power supply shown in FIG. 5 and the trigger circuits. This is accomplished by disposing the power supply closely adjacent the various trigger circuits and by energizing the transformers of these power supplies from a common oscillator 234.

The system also is arranged so that the amount of amplification required to produce the fast rise trigger signal, shown at the bottom of FIG. 9, is reduced to a minimum. This is accomplished by the high-frequency energization of the transformers 136 and 138 of the trigger circuits and by the use of a square loop core material for these transformers and also the use of the bias windings 160 and 162 for the transformers. This, in effect, increases the speed of the transformer which results in an improved signal to noise ratio thus requiring less amplification.

In regard to the bias windings 160 and 162 for the transformers it is pointed out that in addition to aiding in producing the fast rise trigger they also tend to render the system more noise immune since they set a threshold for noise signals which must be overcome before they would affect the system.

With regard to FIG. 9, and at the expense of some reiteration, it is pointed out that the fast rise gate-cathode voltage shown at the bottom of FIG. 9 has the same pulse width as signal A+ shown at the top of FIG. 9. It is noted, however, that the gate-cathode signal applied to the controlled rectifier rises sharply in amplitude at the beginning of the pulse as shown in FIG. 9 and this is due to the provision of the capacitor 210 and resistor 208. The amplitude of this signal then reduces to a steady state value which is sufficient to hold the controlled rectifier conductive. This provides the proper fast rise trigger for quickly gating a given controlled rectifier conductive for a period of time determined by the three-phase logic. The initial larger amplitude fast rise portion of the signal labeled fast rise in FIG. 9 may have a pulse width for example of only 0.5 microseconds.

What is claimed is:

1. An electrical system for providing an electrically isolated direct voltage signal that is capable of controlling the forward biasing of the gate-cathode circuit of a controlled rectifier for periods of time corresponding to the pulse width of said signal comprising, a control means for determining the conduction periods of said controlled rectifier, first and second transformers each having a primary winding and a secondary winding, a source of direct voltage, a switching means connected with said source of direct voltage and said primary windings for alternately energizing said primary windings at a predetermined rate, said switching means including means controlled by said control means for determining the time period of alternate energization of said primary windings, and means connecting said secondary windings to a conductor means whereby a continuous direct voltage is developed across said conductor means by voltages induced in said secondary windings, said direct voltage having a pulse width determined by said control means.

2. The electrical system according to claim 1 where the switching frequency of said switching means is such that said primary windings are switches a plurality of times for each conduction period of a controlled rectifier as determined by said control means.

3. A trigger system for gating a plurality of controlled rectifiers of a power control system sequentially conductive comprising, a control means for determining the conduction period and frequency of occurrence of conduction periods of said controlled rectifiers, a trigger circuit for each controlled rectifier, each trigger circuit comprising first and second transformers each having a primary windings for alternately energizing said primary windings with direct current for a predetermined total time period determined by said control means and with a predetermined overlapping simultaneous energization of said primary windings, means for energizing said bias windings with direct current, the flux developed by said bias windings opposing that developed by energization of said primary windings, and means coupled to said secondary windings for developing a unidirectional voltage which is applied to the gate-cathode circuit of a controlled rectifier to gate a controlled rectifier on for periods of time determined by said control means.

4. An electrical system for gating a controlled rectifier to a conductive condition for predetermined sequentially occuring time periods comprising, first and second transformers each having a primary winding, a secondary winding and a bias winding, a source of direct current, a first switching means coupled with said source of direct current and one side of said primary windings, control means coupled to said first switching means for causing said first switching means to be conductive for said predetermined time periods whereby one side of said source of direct current is connected to one side of each primary winding of said first and second transformers for said predetermined periods of time, second and third switching means connecting an opposite side of said source of direct current with respective opposite sides of said primary windings, means coupled to said second and third switching means causing said second and third switching means to be rendered alternately conductive with a predetermined overlap in the conduction of said second and third switching and either said second and third switching means are in a conductive condition, means for energizing said bias windings with direct current, and means including a capacitor connected to said secondary windings of said transformers providing a fast rise unidirectional voltage applied to the gate-cathode circuit of said controlled rectifier which has a pulse width that substantially corresponds to the time period that said first switching means is closed.

5. An electrical system for gating a controlled rectifier to a conductive condition for predetermined time periods comprising, first and second transformers, each of said transformers having a primary winding, a secondary winding and a direct-current bias winding, a first switching device, a source of direct-current, said first switching device connected between one side of said primary windings of said transformers and one side of source of direct current, control means connected with said first switching device for causing said first switching device to be rendered conductive for said predetermined periods of time, means connected with said second and third switching devices for causing said second and third switching devices to be alternately conductive with a predetermined overlap in conducting periods of said first and second switching devices, means coupling said direct-current bias windings to a source of direct current, means connected with the secondary windings of said transformers for providing unidirectional voltage having a pulse width corresponding to said predetermined time periods, and means for applying said unidirectional voltage to the gate-cathode circuit of said controlled rectifier whereby said controlled rectifier is biased conductive for said predetermined periods of time as determined by the conductive periods of time of said first switching device, the flux developed by said bias windings opposing the flux developed by said primary windings.

6. An electrical system for sequentially gating a plurality of controlled rectifiers to a conductive condition for predetermined periods of time comprising, a source of direct current, first and second transformers for each controlled rectifier, each of said transformers having a primary winding, a secondary winding and a bias winding, a plurality of first switching devices equal in number to pairs of transformers, second and third switching devices, means electrically connecting each first switching device between one side of a pair of primary windings of a pair of transformers and one side of said source of direct current, means electrically connecting said second and third switching devices between opposite sides of pairs of primary windings of pairs of transformers and said source of direct current, cycling means coupled to said first switching devices for causing said first switching devices to be rendered conductive in a predetermined sequence for predetermined lengths of time which correspond to the desired conduction periods of said controlled rectifiers, means connected with a said second and third switching devices for causing said second and third switching devices to become alternately conductive with a predetermined overlap in conduction periods of said second and third switching devices, means connecting said bias windings with a source of direct current, the flux developed by said bias windings opposing the flux developed by said primary windings, means electrically connecting the secondary windings of each pair of transformers to provide unidirectional signal voltages which have a pulse width corresponding to the conduction periods of said first switching devices, and means including a capacitor for applying fast rise unidirectional voltages to the gate-cathode circuits of said controlled rectifiers of a pulse width corresponding to said unidirectional signal voltage.

7. An electrical system comprising, a source of polyphase alternating current, a polyphase electrical load, a converter connecting said source of alternating current and said electrical load, said converter comprising a plurality of full-wave switching circuits each of which is comprised of a plurality of controlled rectifiers, a plurality of pairs of transformers, one pair of said transformers for each controlled rectifier switching circuit, each transformer having a primary winding, a secondary winding and a bias winding, a plurality of first logic switching devices equal in number to said full-wave switching circuits, second and third switching devices, a source of direct current, means electrically connecting one side of a pair of primary windings of a pair of transformers with an opposite side of said source of direct current through said second and third switching devices logic control means connected with said first switching devices for causing said first switching devices to be rendered conductive for predetermined periods of time in a polyphase sequence, means connected to said second and third switching devices to be rendered alternately conductive with a predetermined overlap in conduction periods current, the flux developed by said bias windings opposing the flux developed by said primary windings, means electrically connecting the secondary windings of pairs of transformers in such a manner that a unidirectional signal voltage is developed which has a pulse width that corresponds the the conduction periods of said first switching devices, and fast rise trigger means including a capacitor applying unidirectional fast rise voltages to the gate-cathode circuit of a respective controlled rectifier having pulse width corresponding to said signal voltage whereby said plurality of controlled rectifiers are gated conductive for predetermined lengths of time corresponding to the conduction periods of said first switching devices.

8. The electrical system according to claim 7 where said polyphase electrical load is a polyphase induction motor and where the output frequency of said converter can be varied to control the frequency of the input voltage to the motor.

9. An electrical system for gating a controlled rectifier to a conductive state for predetermine periods of time comprising, first and second transformers each having a primary winding, a secondary winding and a bias winding, a source of direct current, a first switching device connected between sides of said primary windings of said transformers and one side of said source of direct current, second and third switching devices connected respectively between an opposite side of said source of direct current an opposite sides of primary windings whereby a primary winding can be energized when said first switching device is closed and when one one of said second or third switching devices is closed, means for causing said second and third switching devices to become alternately conductive with a predetermined overlap in conduction, said lastname means including means for causing said second and third switching devices to have a higher switching frequency than the switching frequency of said first switching device, means energizing said bias windings with direct current, the flux developed by said bias windings opposing the flux developed by said primary windings, means electrically connecting said secondary windings of said first and second transformers to provide a unidirectional voltage the pulse width of which is a function of the conduction period of said first switching device, and means for controlling the gate-cathode circuit of said controlled rectifier in accordance with the pulse width of said unidirectional voltage whereby said controlled rectifier is gated conductive for periods of time corresponding to the conduction periods of said first switching means.

10. An electric drive system for an electrically propelled vehicle the combination comprising, an alternating current generator having a polyphase output winding, said generator having a rotor driven by a prime mover of said vehicle, a polyphase induction motor having a polyphase winding, means mechanically connecting the rotor of said induction motor with at least one driving wheel of said vehicle, a converter electrically connected between the output winding of said alternating current generator and said polyphase winding of said induction motor, said converter including a plurality of full-wave switching circuits each of which is comprised of a plurality of controlled rectifiers, a plurality of pairs of transformers, said pairs of transformers corresponding in number to said switching circuits, each of said transformers having winding, a secondary winding and a bias winding, a logic switching circuit comprised of a plurality of first switching devices, a source of direct current, means electrically connecting a respective first switching device between one side of a pair of primary winding of a pair of transformers and one side of said source of direct current, second and third switching devices, means electrically connecting said second and third switching devices between an opposite side of said source of direct current and an opposite side of pairs of primary windings of a pair of transformers, means for causing said first switching devices to become conductive in a polyphase sequence, means for causing said second and third switching devices to become alternately conductive with a predetermined overlap in conduction period, means energizing said bias windings with direct current, the flux developed by said bias windings opposing the flux developed by said bias windings opposing the flux developed by said primary windings, means electrically connecting a pair of secondary windings of a pair of transformers to provide a unidirectional voltage having a pulse width which corresponds to the conduction period of a first switching device, and means for gating said controlled rectifiers to a conductive condition for a period of time corresponding to the pulse width of said unidirectional voltage.

UNITED STATES PATENT OFFICE
CERTIFICATE OF CORRECTION

Patent No. 3,611,104                Dated October 5, 1971

Inventor(s) Jalal T. Salihi, et al

It is certified that error appears in the above-identified patent and that said Letters Patent are hereby corrected as shown below:

Column 1, line 2, after "triggering", insert -- system --; line 17, after "is", cancel "carried" and insert -- varied -- ; line 48, "choppings signal chopping" , should read -- chopping signal deenergizes -- ; line 63, after "system" delete "of" and insert -- for -- . Column 3, line 8, after "conductive." delete "+"; line 58, after "square wave", first occurrence, insert -- voltage is applied to the phase windings of the motor. This square wave -- . Column 5, line 22, after "of" delete "the" and insert -- an -- ; line 48, cancel "entirely" and insert -- entirety -- ; line 52, after "each of" insert -- which have six secondary windings as shown in FIG. 4. Each of -- . Column 6, line 14, "the ampere-filters" should read -- the ampere-turns -- ; line 18, after "Referring", insert -- now -- ; lines 46-48, after "switch 102" delete "closes a voltage V168 is now induced in secondary winding 168 of transformer 138. At time $T_2$ switch 104 opens while switch 102"; line 59, after "energize" insert -- and -- . Claim 7, line 14, after "then" insert -- a -- . Column 8, line 4, cancel "change" and insert -- chance -- . Column 9, line 6, delete "reverence" and insert -- reference-- ; line 26, after "course" cancel "at the" and insert -- that -- ; line 46, cancel "an" and insert -- a --. Column 10, line 3, cancel "transistor" and insert -- transistors -- ; line 13, after "Q104" insert -- to become alternately conductive during a conducting period of one group of controlled rectifiers and it will also be appreciated that these conducting periods of transistors Q104 and Q102 -- . Column 11, line 11, delete the comma (,) and insert a period (.) ; line 70, after "windings" insert -- due to alternate energization of said primary windings -- . Column 12,

UNITED STATES PATENT OFFICE
CERTIFICATE OF CORRECTION

Patent No. 3,611,104   Dated October 5, 1971

Inventor(s) Jalal T. Salihi, et al   -2-

It is certified that error appears in the above-identified patent and that said Letters Patent are hereby corrected as shown below:

line 3, delete "switches" and insert -- switched -- ; line 12, cancel "windings" and insert -- winding, a secondary winding and a bias winding, a source of direct current, electrical switching means coupled with said source of direct current and with said primary windings -- ; line 41, after "switching" insert -- means, each primary winding of each transformer being energized by said source of direct current when said first switching means -- ; line 56, after "between" insert -- said -- ; line 57, after "current," insert -- second and third switching devices connecting opposite sides of said primary windings with an opposite side of said source of direct current, -- . Column 13, line 18, after "with" cancel "a"; line 46, after "with" insert -- one side of said source of direct current through a first switching device, means electrically connecting the opposite sides of the primary windings of a pair of transformers with -- ; line 47, after "devices" insert a comma (,); line 51, after "devices", insert -- for causing said second and third switching devices -- ; line 53, after "periods" insert -- , means connecting said bias windings with a source of direct -- ; line 58, cancel "the", first occurrence, and insert -- to -- . Column 14, line 3, "predetermine" should read -- predetermined -- ; line 10, cancel "an" and insert -- and -- ; line 12, after "one" cancel "one"; line 16, "name" should read -- named -- ; line 43, after "having" insert -- a primary -- ; line 48, cancel "winding" and insert -- windings -- .

Signed and sealed this 14th day of November 1972.

(SEAL)
Attest:

EDWARD M. FLETCHER, JR.
Attesting Officer

ROBERT GOTTSCHALK
Commissioner of Patents